United States Patent
Murakami et al.

(10) Patent No.: US 8,553,613 B2
(45) Date of Patent: Oct. 8, 2013

(54) MOBILE COMMUNICATION SYSTEM, BASE STATION DEVICE AND FREQUENCY ALLOCATION METHOD FOR MOBILE COMMUNICATION SYSTEM

(75) Inventors: Youhei Murakami, Yokohama (JP); Masamitsu Nishikido, Yokohama (JP); Takeshi Nakano, Yokohama (JP); Yutaka Ootsuki, Yokohama (JP)

(73) Assignee: Kyocera Corporation, Kyoto (JP)

(*) Notice: Subject to any disclaimer, the term of this patent is extended or adjusted under 35 U.S.C. 154(b) by 584 days.

(21) Appl. No.: 12/298,503

(22) PCT Filed: Apr. 27, 2007

(86) PCT No.: PCT/JP2007/059202
§ 371 (c)(1),
(2), (4) Date: Apr. 14, 2009

(87) PCT Pub. No.: WO2007/126065
PCT Pub. Date: Nov. 8, 2007

(65) Prior Publication Data
US 2010/0027482 A1 Feb. 4, 2010

(30) Foreign Application Priority Data
Apr. 27, 2006 (JP) ................. 2006-124195

(51) Int. Cl.
*H04W 4/00* (2009.01)
(52) U.S. Cl.
USPC ............................ 370/328; 370/329; 370/330
(58) Field of Classification Search
USPC ............. 370/208, 203, 210, 215, 207, 252, 370/329, 335, 478, 347, 529, 328, 330; 375/260, 335, 142, 150, 261, 343, 316, 267, 375/338, 340; 455/63.3, 69, 62, 76, 522
See application file for complete search history.

(56) References Cited

U.S. PATENT DOCUMENTS

| 5,203,008 A | 4/1993 | Yasuda et al. |
| 6,088,345 A | 7/2000 | Sakoda et al. |

(Continued)

FOREIGN PATENT DOCUMENTS

| CN | 1238609 A | 12/1999 |
| EP | 0786890 A2 | 7/1997 |

(Continued)

OTHER PUBLICATIONS

Korean language office action and its English language translation for corresponding Korean application 20087027433 lists the references above.

(Continued)

*Primary Examiner* — Abdullah Riyami
(74) *Attorney, Agent, or Firm* — DLA Piper LLP (US)

(57) ABSTRACT

In a base station device 12 of an OFDMA mobile communication system, a frequency band storage unit 22 stores multiple frequency bands allocatable to mobile station devices, respectively, in association with predetermined conditions related to communication quality. A communication quality acquisition unit 37 acquires communication quality in communication with each of the mobile station devices. A frequency allocator 24 selects any one of the frequency bands from the frequency band storage unit 22 on the basis of the communication quality acquired by the communication quality acquisition unit 37, and notifies the mobile station device of channel information indicating the selected frequency band. Then, the mobile station device communicates with the base station device 12 in the frequency band indicated by the channel information notified by the frequency allocator 24 in the base station device 12.

5 Claims, 8 Drawing Sheets

(56) References Cited

U.S. PATENT DOCUMENTS

| | | | |
|---|---|---|---|
| 6,363,099 B1* | 3/2002 | Sakoda et al. | 375/131 |
| 6,628,606 B1* | 9/2003 | Hong et al. | 370/208 |
| 6,658,257 B1 | 12/2003 | Hirayuma et al. | |
| 6,768,714 B1* | 7/2004 | Heinonen et al. | 370/208 |
| 6,781,974 B1 | 8/2004 | Tsumura | |
| 7,298,772 B1* | 11/2007 | Neerudu et al. | 375/136 |
| 7,440,759 B2 | 10/2008 | Kang et al. | |
| 2001/0005375 A1* | 6/2001 | Yamamoto et al. | 370/436 |
| 2001/0006509 A1* | 7/2001 | Nguyen et al. | 370/281 |
| 2001/0050926 A1* | 12/2001 | Kumar | 370/529 |
| 2002/0021715 A1* | 2/2002 | Matheus et al. | 370/480 |
| 2003/0016622 A1* | 1/2003 | McCarty, Jr. | 370/207 |
| 2003/0090994 A1* | 5/2003 | Kakura | 370/208 |
| 2003/0103470 A1* | 6/2003 | Yafuso | 370/282 |
| 2003/0196210 A1* | 10/2003 | Alves | 725/126 |
| 2004/0228283 A1 | 11/2004 | Naguib et al. | |
| 2005/0011146 A1 | 1/2005 | Lee | |
| 2005/0058097 A1 | 3/2005 | Kang et al. | |
| 2005/0111406 A1* | 5/2005 | Pasanen et al. | 370/329 |
| 2005/0232134 A1* | 10/2005 | van Nee | 370/206 |
| 2005/0237918 A1* | 10/2005 | Asai et al. | 370/203 |
| 2006/0050799 A1* | 3/2006 | Hou et al. | 375/260 |
| 2006/0109925 A1* | 5/2006 | Kannan et al. | 375/260 |
| 2006/0133261 A1* | 6/2006 | Cosovic et al. | 370/208 |
| 2006/0154684 A1* | 7/2006 | Meiyappan | 455/522 |
| 2006/0209979 A1* | 9/2006 | Sandell et al. | 375/267 |
| 2006/0240838 A1* | 10/2006 | Suh et al. | 455/454 |
| 2006/0250935 A1 | 11/2006 | Hamamoto et al. | |
| 2007/0002961 A1* | 1/2007 | Hoctor et al. | 375/267 |
| 2007/0064669 A1* | 3/2007 | Classon et al. | 370/347 |
| 2007/0127670 A1 | 6/2007 | Morishima et al. | |
| 2007/0147226 A1* | 6/2007 | Khandekar et al. | 370/208 |
| 2008/0119197 A1* | 5/2008 | Skarby | 455/446 |
| 2008/0144545 A1* | 6/2008 | Stanwood et al. | 370/295 |
| 2008/0285670 A1* | 11/2008 | Walton et al. | 375/260 |
| 2008/0298339 A1* | 12/2008 | Alamouti et al. | 370/347 |
| 2009/0074098 A1* | 3/2009 | Wu et al. | 375/260 |
| 2009/0080575 A1* | 3/2009 | Chuang et al. | 375/340 |
| 2009/0274059 A1* | 11/2009 | Xing et al. | 370/252 |
| 2010/0144282 A1* | 6/2010 | Laroia et al. | 455/63.3 |
| 2012/0320834 A1* | 12/2012 | Branlund et al. | 370/328 |

FOREIGN PATENT DOCUMENTS

| | | |
|---|---|---|
| EP | 0964596 | 12/1999 |
| EP | 1610573 A1 | 12/2005 |
| JP | 03-167924 A | 7/1991 |
| JP | 10-155179 A | 6/1998 |
| JP | 11-355838 A | 12/1999 |
| JP | 2003298751 A | 10/2003 |
| JP | 2004-523934 A | 8/2004 |
| JP | 2005-229468 A | 8/2005 |
| KR | 2005028354 A | 3/2005 |
| WO | 9701256 A1 | 1/1997 |
| WO | 99/59362 | 11/1999 |
| WO | 02/31991 A2 | 4/2002 |
| WO | 0249305 A2 | 6/2002 |
| WO | 2004/077712 A1 | 9/2004 |
| WO | 2006003709 A1 | 1/2006 |
| WO | 2006/092852 A1 | 9/2006 |

OTHER PUBLICATIONS

Hwasun Yoo et al., "Edge Sidelobe Suppressor Schemes for Uplink of Orthogonal Frequency Division Multiple Access Systems" IEEE Global Telecommunications Conference, Conference Proceedings, vol. 1, p. 584-588, Nov. 17, 2002.

Georgios Giannakis et al., "Blind Carrier Frequency Offset Estimation in SISO, MIMO, and Multiuser OFDM Systems" IEEE Transactions on Communications, IEEE Conference Proceedings, vol. 53, No. 1, pp. 173-183, Jan. 1, 2005.

Jan-Japp Van De Beek et al., "A Time and Frequency Synchronization Scheme for Multiuser OFDM" IEEE Journal on Selected Areas of Communication, vol. 17, No. 11, pp. 1900-1914, Nov. 1, 1999.

Extended European search report dated Nov. 19, 2012 issued in corresponding European application 07742637.7 cites the U.S. patent application publications, foreign patent documents and non-patent literature listed above.

* cited by examiner

FREQUENCY

FREQUENCY

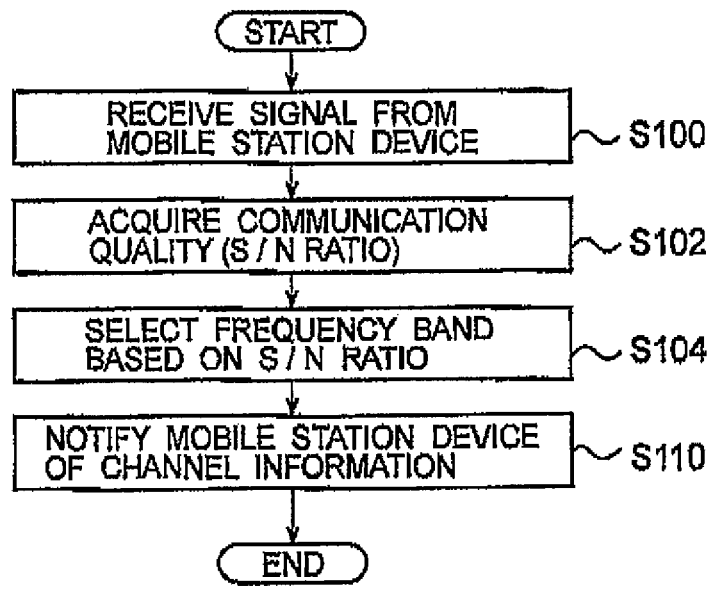
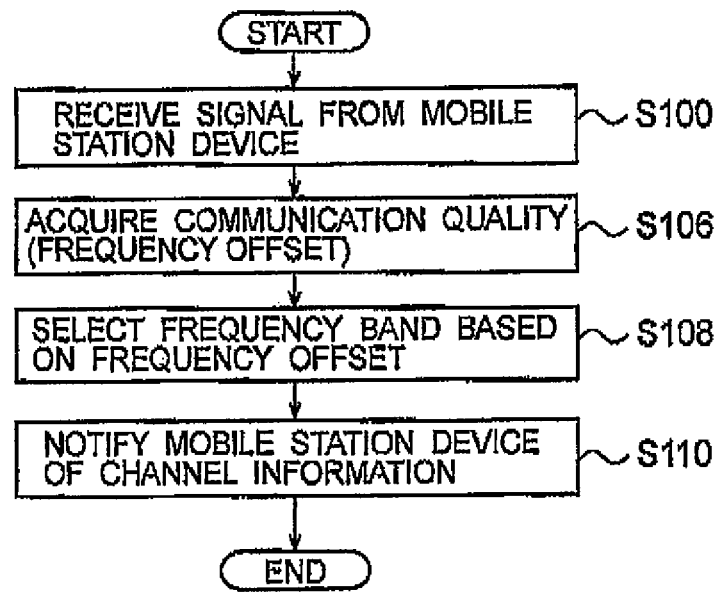

MOBILE COMMUNICATION SYSTEM, BASE STATION DEVICE AND FREQUENCY ALLOCATION METHOD FOR MOBILE COMMUNICATION SYSTEM

CROSS-REFERENCE TO THE RELATED APPLICATIONS

This application is a national stage of international application No. PCT/JP2007/059202 filed on Apr. 27, 2007, which also claims the benefit of priority under 35 USC 119 to Japanese Patent Application No. 2006-124195 filed Apr. 27, 2006, the entire contents of which are incorporated herein by reference.

TECHNICAL FIELD

The present invention relates to a mobile communication system, a base station device and a frequency allocation method for the mobile communication system. In particular, the present invention relates to a mobile communication system for performing communication by orthogonal frequency division multiplexing, a base station device and a frequency allocation method for the mobile communication system.

BACKGROUND ART

OFDM (Orthogonal Frequency Division Multiplexing) is one type of multicarrier modulation method and is a method for performing communication by transmitting divided data on multiple subcarriers which are orthogonal to each other. Each of the subcarriers is modulated by QPSK (Quadrature Phase Shift Keying), QAM (Quadrature Amplitude Modulation) or the like. When the subcarriers are orthogonal to each other, each of the subcarriers has a frequency in which the power of the other subcarriers is set to zero as shown in FIG. 1. Thus, the subcarriers can be densely arranged so that their waveforms are overlapped with each other, allowing reduction in the frequency bands to be used. Furthermore, the data is allocated to each of the subcarriers, and thus a data transfer rate in each of the subcarriers can be lowered compared with the case of a single carrier. Consequently, a time, called a guard interval, for absorbing a delayed wave can be provided for each symbol.

Moreover, in a multipath environment, a fading phenomenon that a reception level of a certain frequency drops may occur. However, even if the data is partially lost, OFDM can reduce influences of the lost data by interleaving and error correction because the data is distributed to the subcarriers in OFDM. OFDM is usually utilized in combination with a multiple access method such as FDMA (Frequency Division Multiple Access) and TDMA (Time Division Multiple Access).

Meanwhile, OFDMA (Orthogonal Frequency Division-Multiple Access) is the same as OFDM in dividing a carrier into multiple subcarriers as shown in FIG. 2. OFDMA is a method for achieving multiple access by sharing all the subcarriers among all users, grouping a certain number of subcarriers as a subchannel, and adaptively allocating the subchannel to each of the users at any timing.

Note that Japanese Patent Application Publication No. 2005-229468 discloses a technique of receiving, from a communication partner device, a control signal used to provide a radio frequency band and a transmission frequency, and allowing a radio frequency band and a transmission frequency of an OFDM-modulated radio transmission signal to be changed according to the control signal.

According to the above technique, for example, a control signal specifying a radio frequency band and a transmission frequency for each radio transmission signal is given to each of multiple cameras. Accordingly, each camera is allowed to change a frequency band or a center frequency of the radio transmission signal according to the given control signal. As a result, an output channel of a receiver for allocating a broadband channel and a narrowband channel can be changed as needed. Thus, it is possible to implement a wireless camera system capable of effectively utilizing limited frequency bands.

DISCLOSURE OF THE INVENTION

In a mobile communication system adopting OFDM, ICI (Inter Carrier Interference) may be caused between adjacent subchannels by a frequency offset or jitter caused between a base station device and a mobile station device. Specifically, ICI is less likely to occur if subcarriers of respective communication channels are not adjacent to each other, as shown in FIG. 3. On the other hand, when the subcarriers are adjacent to each other as shown in FIG. 4, subcarrier orthogonality is lost due to ICI. Thus, communication quality is deteriorated.

For example, as shown in FIG. 5, a mobile station device 14b positioned at a cell edge of a cover area of a base station device 12 is more likely to be influenced by ICI caused by frequency jitter due to its low S/N (signal-to-noise) level. On the other hand, mobile station devices 14a and 14c positioned near the base station device 12 are less likely to be influenced by ICI because of their high S/N levels.

In order to prevent communication quality deterioration attributable to ICI, it has heretofore been required to sacrifice any one of frequency utilization efficiency and communication throughput. Specifically, when predetermined guard bands are always provided between adjacent communication channels to prevent occurrence of ICI, a data error rate is lowered. Accordingly, although the communication throughput is improved, there is a problem that the frequency utilization efficiency is lowered. Meanwhile, when data retransmission or error correction is performed instead of providing the guard bands, the frequency utilization efficiency is improved but a problem of lowering the communication throughput arises.

The present invention has been made in view of the conventional problems described above. It is an object of the present invention to provide a mobile communication system, a base station device and a frequency allocation method for the mobile communication system, which enable appropriate frequency allocation while improving both frequency utilization efficiency and throughput in OFDMA radio communication.

In order to achieve the above object, a mobile communication system according to the present invention includes multiple mobile station devices and a base station device for performing communication with each of the mobile station devices by orthogonal frequency division multiplexing in a predetermined frequency band. The base station device includes: a frequency band storage unit configured to store multiple frequency bands that can be respectively allocated to the mobile station devices, in association with predetermined conditions related to communication quality; a communication quality acquisition unit configured to acquire communication quality in communication with each of the mobile station devices; and a frequency allocator configured to select a frequency band to be allocated to each of the mobile station devices from the frequency band storage unit on the basis of the communication quality acquired by the communication quality acquisition unit, and to notify the mobile station device of channel information indicating the selected frequency band. Each of the mobile station devices communicates with the base station device in the frequency band indicated by the channel information notified by the frequency allocator.

A base station device according to the present invention performs communications with multiple mobile station devices by orthogonal frequency division multiplexing in predetermined frequency bands. The base station device includes: a frequency band storage writ configured to store multiple frequency bands that can be respectively allocated to the mobile station devices in association with predetermined conditions related to communication quality; a communication quality acquisition unit configured to acquire communication quality in communication with each of the mobile station devices; and a frequency allocator configured to select a frequency band to be allocated to each Of the mobile station devices from the frequency band storage unit on the basis of the communication quality acquired by the communication quality acquisition unit and to notify the mobile station device of channel information indicating the selected frequency band.

Moreover, a frequency allocation method for a mobile communication system according to the present invention is a frequency allocation method for a mobile communication system including multiple mobile station devices and a base station device for performing communication with each of the mobile station devices by orthogonal frequency division multiplexing in a predetermined frequency band. The method includes a step of storing, in the base station device, a plurality of frequency bands allocatable to each of the mobile station devices in a frequency to band storage unit, in association with predetermined conditions related to communication quality; a communication quality acquisition step of acquiring, in the base station device, communication quality in communication with each of the mobile station devices; a frequency allocation step of selecting, in the base station device, a frequency band to be allocated to each of the mobile station devices from the frequency band storage unit on the basis of the communication quality acquired in the communication quality acquisition step, and of notifying the mobile station device of channel information indicating the selected frequency band; and a step of communicating, in each of the mobile station devices, with the base station device in the frequency band indicated by the channel information notified in the frequency allocation step.

According to the present invention, in the base station device, the multiple allocatable frequency bands are stored in association with the predetermined conditions related to the communication quality. Then, based on communication quality in communication with each of the mobile station devices, a frequency so band to be allocated to the mobile station device is selected. Moreover, channel information indicating the selected frequency band is notified to the mobile station device. Then, the mobile station device notified of the channel information by the base station device communicates with the base station device in the frequency band indicated by the channel information. According to the present invention, in OFDMA radio communication, multiple allocatable frequency bands can be appropriately associated with the conditions related to the communication quality. Thus, on the basis of the communication quality in communication with each of the mobile station devices, appropriate frequency allocation can be performed while improving both frequency utilization efficiency and throughput.

Moreover, according to one aspect of the present invention, a guard band having a predetermined width according to the communication quality is provided between the frequency bands stored in the frequency band storage unit. Thus, the number and bandwidth of the guard bands provided between the frequency bands can be reduced. Consequently, the frequency utilization efficiency can be improved. Moreover, the frequencies in a portion where no guard bands are provided between the frequency bands can be allocated to the mobile station device which performs high quality communication since ICI is unlikely to occur. Meanwhile, the frequencies in a portion where the guard bands having a proper bandwidth according to the quality are provided can be allocated to the mobile station device which performs low quality communication since ICI is likely to occur. Thus, the throughput can be improved while suppressing a data error rate.

Moreover, according to one aspect of the present invention, the communication quality acquisition unit acquires a difference in magnitude between a desired signal level of a received signal and an interference signal level in a frequency band allocated to, each of the mobile station devices. Thus, based on the difference in magnitude between the signal levels, the frequencies can be appropriately allocated to the respective mobile station devices.

Moreover, according to one aspect of the present invention, the communication quality acquisition unit acquires a frequency difference (frequency offset) between the frequency band allocated to the mobile station device and the frequency band of the signal received from the mobile station device. Thus, based on the magnitude of the frequency offset, the frequencies can be appropriately allocated to the respective mobile station devices.

BRIEF DESCRIPTION OF THE DRAWINGS

FIG. 11 is a flowchart illustrating frequency allocation processing based on an S/N ratio.

FIG. 12 is a flowchart illustrating frequency allocation processing based on a frequency offset.

BEST MODE FOR CARRYING OUT THE INVENTION

Figure 1:
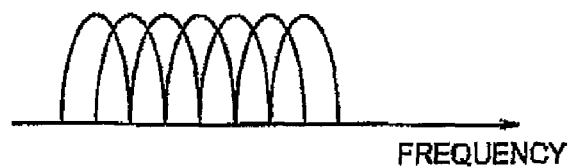
FIG. 1 shows a frequency spectrum of OFDM.
Figure 2:
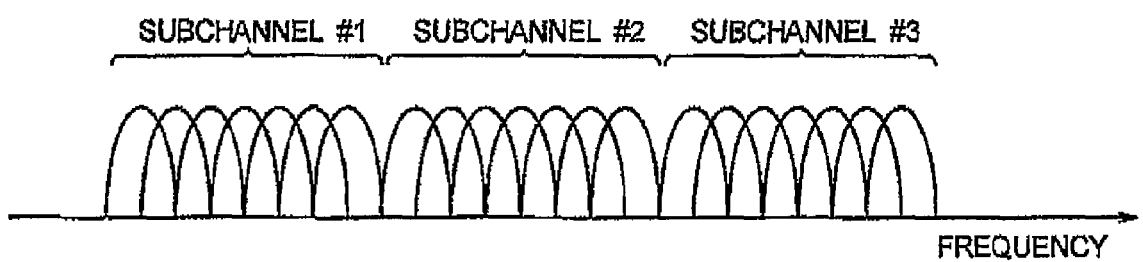
FIG. 2 shows an example of subchannels in OFDMA.
Figure 3:
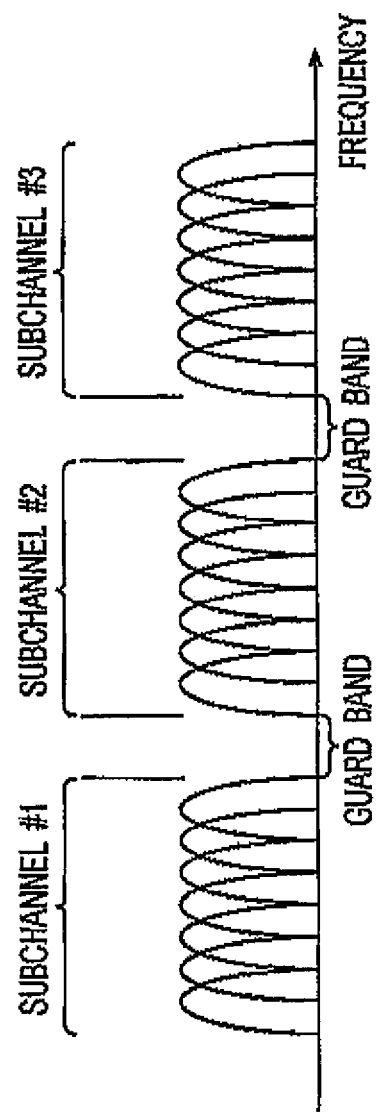
FIG. 3 shows an example in which guard bands are provided between the subchannels in OFDMA.
Figure 4:
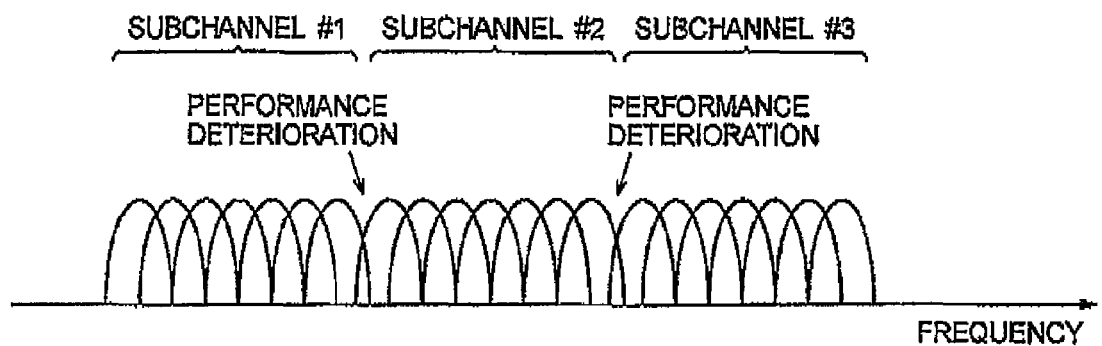
FIG. 4 shows an example in which interferences occur between adjacent subchannels due to communication quality deterioration in OFDMA.
Figure 5:
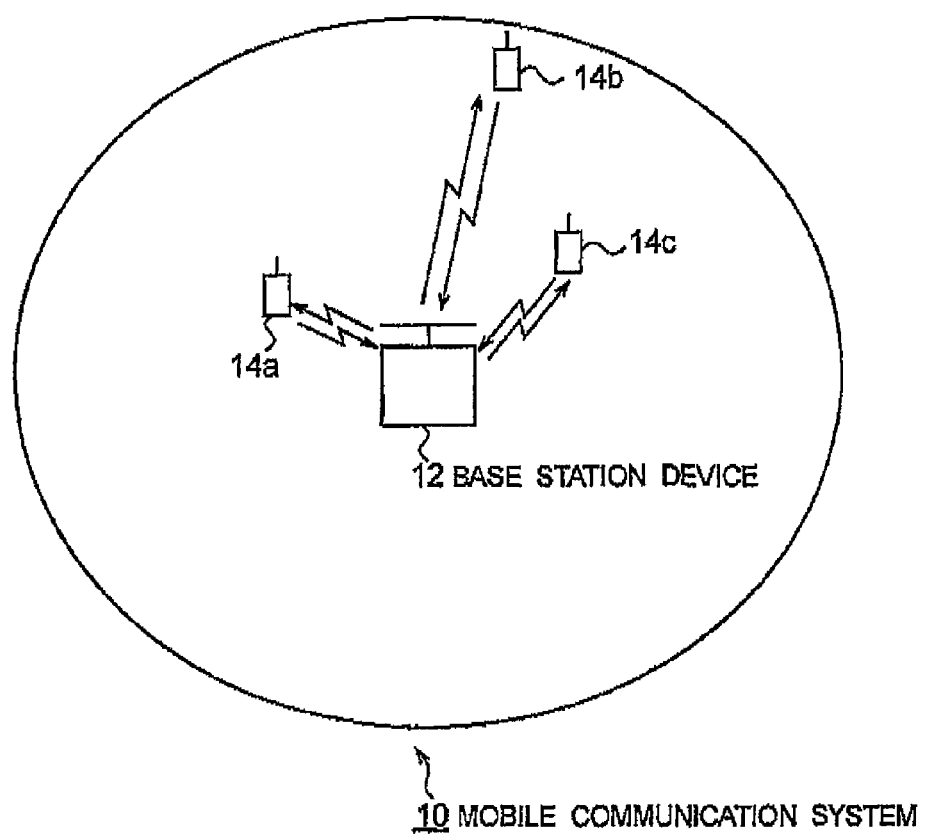
FIG. 5 is a configuration diagram of a mobile communication system according to an embodiment of the present invention.

With reference to the drawings, an embodiment of the present invention will be described below. FIG. 5 shows a configuration of a mobile communication system 10 according to the embodiment of the present invention. The mobile communication system 10 includes at least one base station device 12 and multiple mobile station devices 14.

Figure 6:
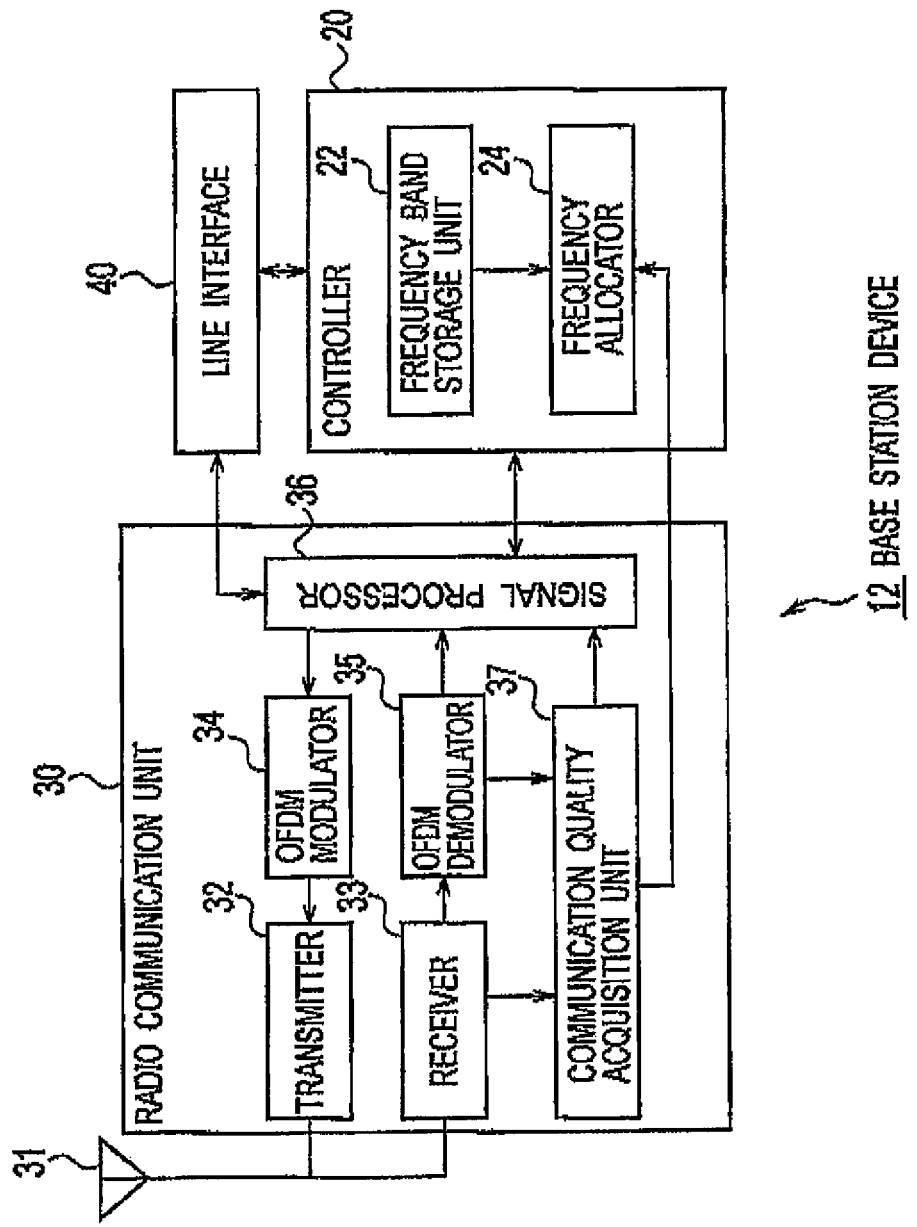
FIG. 6 is a functional block diagram of a base station device according to the embodiment of the present invention.

FIG. 6 is a functional block diagram of the base station device 12. As shown in FIG. 6, the base station device 12 includes a controller 20, a radio communication unit 30 and a line interface 40. The base station device 12 transmits and receives radio signals by OFDMA to and from each of the multiple mobile station devices 14, and also transmits and receives packets to and from each of multiple other base station devices through the line interface 40.

The radio communication unit 30 includes an antenna 31, a transmitter 32, a receiver 33, an OFDM modulator 34, an OFDM demodulator 35, a signal processor 36 and a communication quality acquisition unit 37. The antenna 31 is connected to the transmitter 32 and the receiver 33.

The receiver 33 includes a low noise amplifier, a down-converter and the like. The receiver 33 down-converts an OFDM signal from the mobile station device 14 into a base band OFDM signal, the OFDM signal being received by the antenna 31, amplifies the base band OFDM signal and outputs the signal to the OFDM demodulator 35 and the communication quality acquisition unit 37. The OFDM demodulator 35 converts the base band OFDM signal received from the receiver 33 into a digital signal, performs OFDM demodulation to extract subcarrier signals and outputs each of the extracted subcarrier signals to the signal processor 36 and the communication quality acquisition unit 37.

The OFDM modulator 34 converts each subcarrier signal received from the signal processor 36 into a base band OFDM signal by OFDM modulation, and outputs the signal to the transmitter 32. The transmitter 32 includes an up-converter, a power amplifier and the like. The transmitter 32 up-converts the base band OFDM signal received from the OFDM modulator 34 into a radio frequency and outputs the radio frequency to the antenna 31 after amplifying the radio frequency to a transmission output level.

The signal processor 36 includes a signal conversion circuit and the like, and is connected to the OFDM modulator 34, the OFDM demodulator 357 the communication quality acquisition unit 37 and the line interface 40. The signal processor 36 separates and extracts data from each of the subcarrier signals received from the OFDM demodulator 35 based on information related to communication quality received from the communication quality acquisition unit 37, and then outputs the data to the line interface 40. Moreover, the signal processor 36 converts multiple pieces of data received from the line interface 40 into subcarrier signals and outputs the signals to the OFDM modulator 34.

The communication quality acquisition unit 37 is connected to the receiver 33, the OFDM demodulator 35, the signal processor 36 and a frequency allocator 24, and acquires communication quality in communication with each of the mobile station devices. Specifically, the communication quality acquisition unit 37 acquires the communication quality for each mobile station device based on received power values and the like of the subcarrier signal received from the OFDM demodulator 35 and the OFDM signal received from the receiver 33. Specifically, the communication quality includes a transmission line distortion, an S/N ratio, a frequency offset and the like for each subcarrier in an uplink to the base station device 12. Thereafter, the communication quality acquisition unit 37 outputs information related to the communication quality to the frequency allocator 24 and the signal processor 36.

The controller 20 includes a frequency band storage unit 22 and the frequency allocator 24, and controls the entire base station device 12. Moreover, the controller 20 consists of a CPU, a memory and the like.

The frequency band storage unit 22 stores multiple frequency bands that can be allocated to the mobile station devices 14, respectively, in association with predetermined conditions related to the communication quality. The predetermined conditions related to the communication quality may be conditions related to a difference in magnitude between a desired signal level and an interference signal level, for example, an S/N ratio of a received signal. Alternatively, the predetermined conditions related to the communication quality may be conditions related to a frequency difference (frequency offset) from a frequency band of a signal received from each of the mobile station devices 14. Moreover, guard bands, each having a predetermined width according to the communication quality, may be provided between the frequency bands stored in the frequency band storage unit 22.

Figure 7:
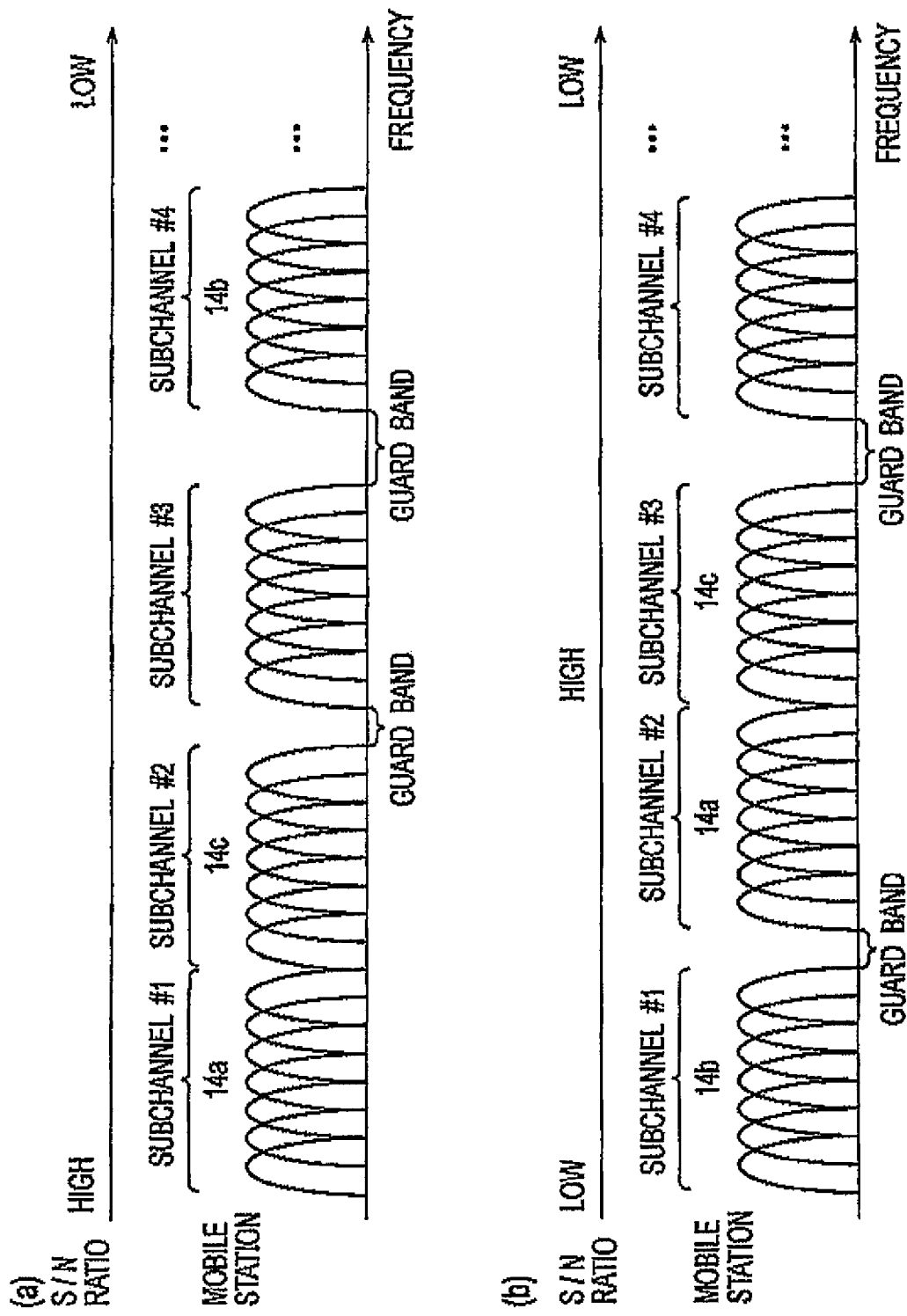
FIG. 7 shows an example of a correspondence relationship between communication quality and allocated frequencies in a frequency band storage unit.

FIG. 7 (a) shows an example of a correspondence relationship between the communication quality (S/N ratio) and the allocatable frequency bands, the correspondence relationship being stored in the frequency band storage unit 22. The frequency band storage unit 22 stores frequency bands related to multiple allocatable subchannels #1, #2, #3 . . . in association with predetermined conditions related to the S/N ratio. Specifically, in FIG. 7 (a), the subchannels of low frequencies are stored in association with the conditions that the S/N ratio is high, and the subchannels of high frequencies are stored in association with the conditions that the S/N ratio is low.

Generally, the higher the S/N ratios the less likely frequency jitter occurs. Accordingly, ICI is less likely to occur. A guard band does not need to be provided between the subchannels associated with the high S/N ratio, such as the subchannels #1 and #2 in FIG. 7 (a). Even if a guard band needs to be provided, it suffices that a guard band having a narrow bandwidth is provided. Meanwhile, when the S/N ratio is low, ICI is likely to be caused by frequency jitter. Thus, when the subchannels associated with the low S/N ratio are adjacent to each other, such as the subchannels #2 and #3, and the subchannels #3 and #4 in FIG. 7 (a), guard bands having a sufficient bandwidth need to be provided in accordance with the S/N ratio to prevent occurrence of ICI.

FIG. 7 (b) shows an example of a correspondence relationship between the S/N ratio and the allocatable frequency bands, the correspondence relationship being stored in the frequency band storage unit 22, as in the case of FIG. 7 (a). Unlike FIG. 7 (a), the frequency band storage unit 22 stores subchannels near the center of the frequency band in association with conditions that the S/N ratio is high, and stores subchannels near edges of the frequency band in association with conditions that the S/N ratio is low. A guard band does not need to be provided between the subchannels associated with the high S/N ratio, such as the subchannels #2 and 43 in FIG. 7 (b). Meanwhile, when the subchannels associated with the low S/N ratio are adjacent to each other, such as the subchannels #1 and #2, and the subchannels #3 and #4, guard bands having a sufficient bandwidth need to be provided in accordance with the S/N ratio.

The multiple allocatable frequency bands are appropriately stored in association with the conditions related to the communication quality such as the S/N ratio. Thus, the number and bandwidth of the guard bands provided between the subchannels for each of the frequency bands can be reduced. Consequently, frequency utilization efficiency can be improved. Moreover, the subchannels in a portion where no guard bands are provided or the guard bands having a narrow bandwidth are provided can be allocated to the mobile station device in which the S/N ratio is high so that ICI is less likely to occur. Meanwhile, the frequencies in a portion where the guard bands having a sufficient bandwidth according to the S/N ratio are provided can be allocated to the mobile station device in which the S/N ratio is low so that ICI is move likely to occur. Thus, throughput can be improved while suppressing a data error rate.

Figure 8:
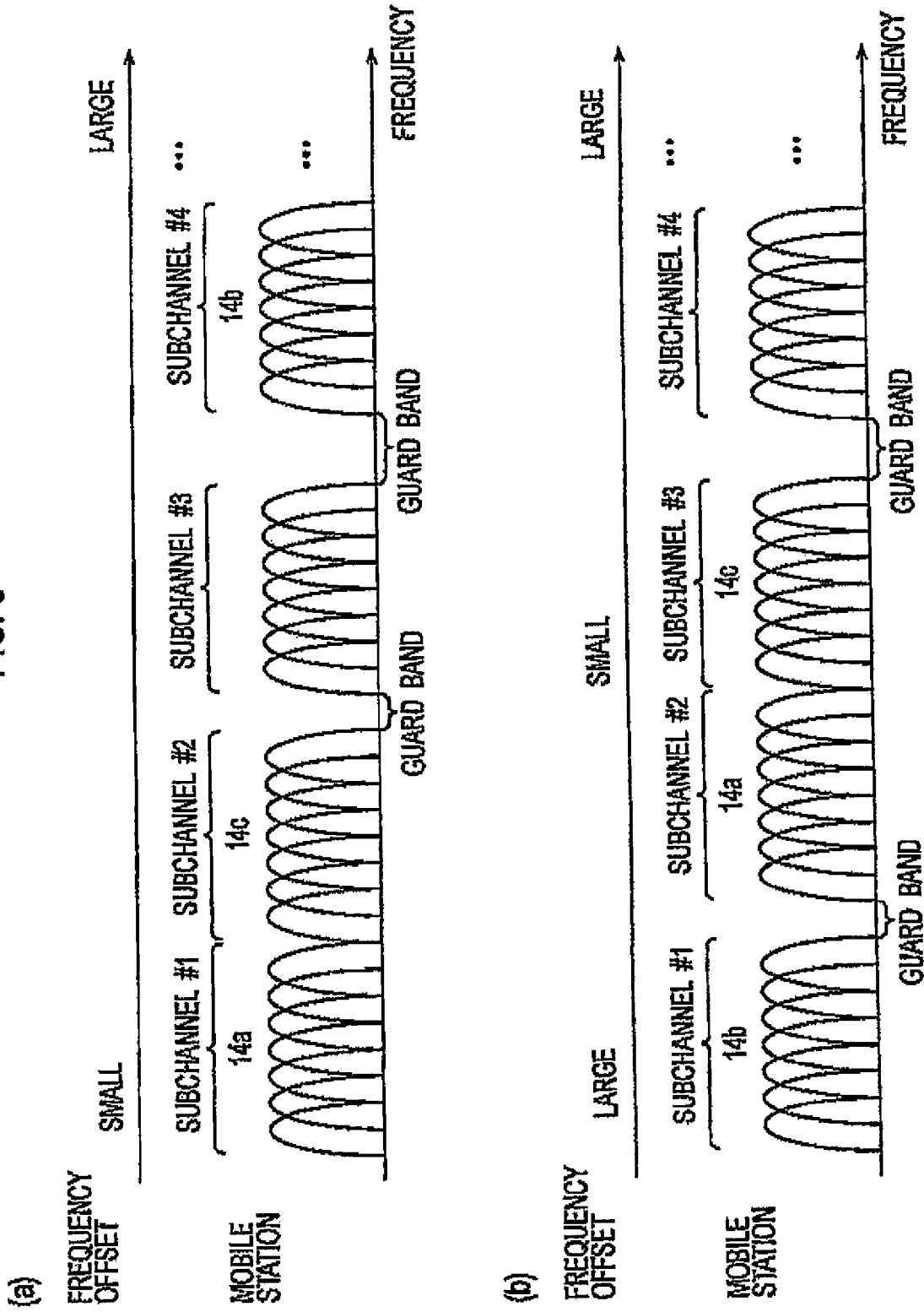
FIG. 8 shows an example of a correspondence relationship between communication quality and allocated frequencies in the frequency band storage unit.

Meanwhile, FIG. 8 (a) shows an example of a correspondence relationship between the communication quality (frequency offset) and the allocatable frequency bands, the correspondence relationship being stored in the frequency band storage unit 22. The frequency band storage unit 22 stores frequency bands related to multiple allocatable subchannels #1, #2, #3 ... in association with predetermined conditions related to the frequency offset. Specifically, in FIG. 8 (a), the subchannels of low frequencies are stored in association with the conditions that the frequency offset is small, and the subchannels of high frequencies are stored in association with the conditions that the frequency offset is large.

Generally, the smaller the frequency offset, the more easily the subcarrier orthogonality is maintained. Accordingly, ICI is less likely to occur. A guard band does not need to be provided between the subchannels associated with the small frequency offset, such as the subchannels #1 and #2 in FIG. 8 (a). Even if a guard band needs to be provided, it suffices that a guard band having a narrow width is provided. Meanwhile, when the frequency offset is large, the subcarrier orthogonality is easily lost. Accordingly, ICI is more likely to occur. Thus, when the subchannels associated with the large frequency offset are adjacent to each other, such as the subchannels #2 and #3, and the subchannels #3 and #4 in FIG. 8 (a), guard bands having a sufficient bandwidth need to be provided in accordance with the frequency offset to prevent occurrence of ICI.

FIG. 8 (b) shows an example of a correspondence relationship between the frequency offset and the allocatable frequency bands the correspondence relationship being stored in the frequency band storage unit 22, as in the case of FIG. 8 (a). Unlike FIG. 8 (a), the frequency band storage unit 22 stores subchannels near the center of the frequency band in association with conditions that the frequency offset is small, and stores subchannels near edges of the frequency band in association with conditions that the frequency offset is large. A guard band does not need to be provided between the subchannels associated with the small frequency offset, such as the subchannels #2 and #3 in FIG. 8 (b). Meanwhile, when the subchannels associated with the large frequency offset are adjacent to each other, such as the subchannels #1 and #2, and the subchannels #3 and #4, guard bands having a sufficient bandwidth need to be provided in accordance with the frequency offset.

The multiple allocatable frequency bands are appropriately stored in association with the conditions related to the communication quality such as the frequency offset. Thus, the number and bandwidth of the guard bands provided between the subchannels for each of the frequency bands can be reduced. Consequently, frequency utilization efficiency can be improved. Moreover, the subchannels in a portion where no guard bands are provided or the guard bands having a narrow bandwidth are provided can be allocated to the mobile station device in which the frequency offset is small so that ICI is less likely to occur. Meanwhile, the frequencies in a portion where the guard bands having a sufficient bandwidth according to the frequency offset are provided can be allocated to the mobile station device in which the frequency offset is large so that ICI is more likely to occur. Thus, throughput can be improved while suppressing a data error rate.

The frequency allocator 24 is connected to the communication quality acquisition unit 37 and the frequency band storage unit 22. The frequency allocator 24 selects the frequency band to be allocated to each of the mobile station devices 14 from the frequency band storage unit 22, on the basis of the communication quality in communication with each of the mobile station devices 14, the communication quality being received from the communication quality acquisition unit 37. Thereafter, the frequency allocator 24 notifies each of the mobile station devices 14 of channel information indicating the selected frequency band. Note that the communication quality received from the communication quality acquisition unit 37 includes, as described above, the transmission line distortion, the S/N ratio, the frequency offset and the like for each subcarrier in the uplink to the base station device 12. Moreover, the channel information to be notified to each of the mobile station devices 14 may include the selected frequency band or each subcarrier frequency within the subchannel, or may include identification information for specifying the selected frequency band or the subchannel.

Here, with reference to FIG. 5 and FIG. 7 (a), a description will be given of an exemplar processing by the frequency allocator 24 for selecting the frequency to be allocated to each of the mobile station devices 14 based on the S/N ratio. FIG. 5 shows an example where mobile station devices 14a and 14c are located near the base station device 12 and a mobile station device 14b is located near a cell edge. Moreover, the frequency bend storage unit 22 shown in FIG. 7 (a) stores subchannels #1 and #2 of low frequencies in association with conditions that the S/N ratio is high, and stores subchannels #3 and #4 of high frequencies in association with conditions that the S/N ratio is low. In this case, the communication quality acquisition unit 37 acquires a high S/N ratio for the mobile station devices 14a and 14c, and acquires a low s/N ratio for the mobile station device 14b. Thereafter, the frequency allocator 24 selects a frequency band related to the subchannels #1 and #2 associated with the high S/N ratio from the frequency band storage unit 22 shown in FIG. 7 (a), and notifies the mobile station devices 14a and 14c of channel information (the subchannels #1 and #2) indicating the frequency band. Meanwhile, the frequency allocator 24 selects a frequency band related to the subchannel #4 associated with the law S/N ratio for the mobile station device 14b, and notifies the mobile station device 14b of channel information (the suchannel #4) indicating the frequency band.

As described above, the subchannels #1 and #2 in a portion where no guard bands are provided or the guard bands having a narrow bandwidth are provided are allocated to the mobile station devices 14a and 14c in which the S/N ratio is high so that ICI is less likely to occur. Meanwhile, the subchannel #4 in a portion where the guard band having a sufficient bandwidth is provided is allocated to the mobile station device 14b in which the S/N ratio is low so that IC; is more likely to occur. Note that the above processing is executed when the mobile station device 14 establishes a link to the base station device 12 or at an arbitrary timing during communication.

Figure 9:
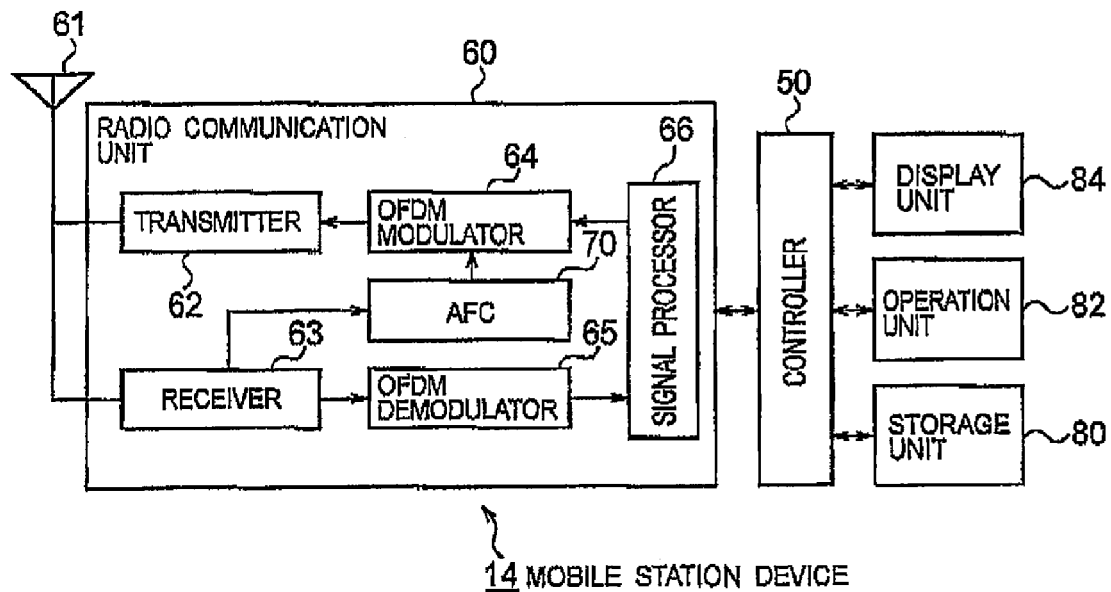
FIG. 9 is a functional block diagram of a mobile station device according to the embodiment of the present invention.

FIG. 9 is a functional block diagram of the mobile station device 14. As shown in FIG. 9, the mobile station device 14 includes a controller 50, a radio communication unit 60, a storage unit 80, an operation unit 82 and a display unit 84. The mobile station device 14 transmits and receives radio signals by OFDMA to and from the base station device 12 and communicates with the base station device in the frequency band indicated by the channel information notified by the frequency allocator 24 of the base station device 12.

The storage unit 80 operates as a work memory of the controller 50. Moreover, the storage unit 80 holds programs, parameters and the like related to various processing to be executed by the controller 50. The operation unit 82 is, for example, a ten key pad or the like for receiving input of a telephone number or a character string by a user and outputting the received input to the controller 50. The display unit 84 is formed of a liquid crystal display unit, for example, and displays information such as characters and images according to signals received from the controller 50. The controller 50 includes a CPU, a memory and the like, and controls the entire mobile station device 14.

The radio communication unit 60 includes an antenna 61, a transmitter 62, a receiver 63, an OFDM modulator 64, an OFDM demodulator 65, a signal processor 66 and an AFC 70 (Automatic Frequency Control). The antenna 61 is connected to the transmitter 62 and the receiver 63.

The receiver 63 includes a low noise amplifier, a down-converter and the like. The receiver 63 down-converts an OFDM signal received from the base station device 12 through the antenna 61 into a base band OFDM signal. Thereafter, the receiver 63 amplifies the base band OFDM signal and outputs the signal to the OFDM demodulator 65. The receiver 63 also detects a symbol timing from the base band OFDM signal and outputs, to the AFC 70, a signal having a frequency corresponding to the symbol timing as a reference signal. The OFDM demodulator 65 converts the base band OFDM signal received from the receiver 63 into a digital signal, performs OFDM demodulation to extract subcarrier signals, and outputs each of the extracted subcarrier signals to the signal processor 66.

Figure 10:
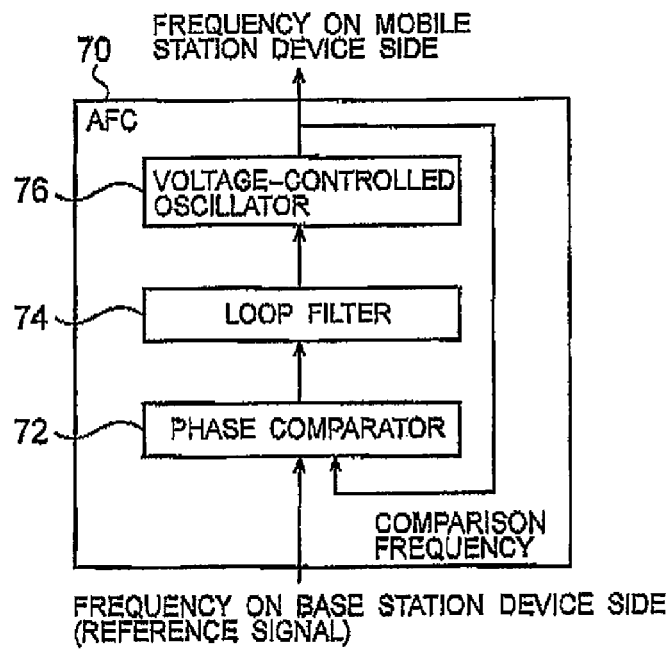
FIG. 10 is a functional block diagram of an AFC.

The AFC 70 is connected to the receiver 63 and the OFDM modulator 64, and outputs, on the basis of the reference signal received from the receiver 63, a signal (hereinafter referred to as a symbol frequency signal) having a frequency synchronized with the symbol timing of the base band OFDM signal to the OFDM modulator 64. FIG. 10 is a functional block diagram of the AFC 70. As shown in FIG. 10, the AFC 70 includes a phase comparator 72, a loop filter 74 (integrating circuit/low-pass filter) and a voltage controlled oscillator 76 (VCO), and can output a frequency signal fully synchronized with a reference signal inputted from the outside. The phase comparator 72 detects a phase difference between the reference signal inputted from the outside and a frequency signal fed back from the voltage controlled oscillator 76. Thereafter, the phase comparator 72 outputs, to the loop filter 74, the phase difference component as a phase difference signal on a pulse. The loop filter 74 outputs, to the voltage controlled oscillator 76, a signal converted into a direct current by blocking a high frequency component of the phase difference signal received front the phase comparator 72. The voltage controlled oscillator 76 is an oscillator configured to change an oscillating frequency according to a voltage applied to a control terminal. The voltage controlled oscillator 76 adjusts the oscillating frequency according to a control voltage applied by the loop filter 74, and outputs a frequency signal having a frequency fully synchronized with the reference signal inputted to the AFC 70.

The OFDM modulator 64 is connected to the transmitter 62, the signal processor 66 and the AFC 70. The OFDM modulator 64 converts the subcarrier signal received from the signal processor 66 into a base band OFDM signal by OFDM modulation based on the symbol frequency signal received from the AFC 70, and outputs the base band OFDM signal to the transmitter 62. Accordingly, a symbol timing of the OFDM signal to be transmitted by the mobile station device 14 is synchronized with the symbol timing of the OFDM signal received from the base station device 12. Thus, a frequency drift between the mobile station device 14 and the base station device 12 is eliminated. The transmitter 62 includes an up-converter, a power amplifier and the like. The transmitter 62 up-converts the base band OFDM signal received from the OFDM modulator 64 into a radio frequency and outputs the radio frequency to the antenna 61 after amplifying the radio frequency to a transmission output level.

Note that, when the channel information is notified from the base station device 12, in other words, when a new frequency band to be used for communication with the base station device 12 is allocated, the mobile station device 14 determines a subcarrier frequency to be used for subsequent communication on the basis of the channel information. Thus, the mobile station device 14 can communicate with the base station device 12 in the frequency band newly allocated by the base station device 12.

Next, with reference to a flowchart of FIG. 11, a description will be given of processing of allocating a frequency to the mobile station device 14 based on the S/N ratio. This processing is executed when the mobile station device 14 establishes a link to the base station device 12 or at an arbitrary timing during communication with the mobile station device 14. The frequency band storage unit 22 previously stores multiple frequency bands that can be respectively allocated to the mobile station devices 14 in association with predetermined conditions related to the S/N ratio.

When this processing is started in the base station device 12, the receiver 33 outputs, to the communication quality acquisition unit 37, an OFDM signal received from the mobile station device 14 through the antenna 31 in S100.

Next, the communication quality acquisition unit 37 acquires an S/N ratio of the mobile station device 14 based on a received power value and the like of the OFDM signal received from the receiver 33 (S102), and outputs the S/N ratio to the frequency allocator 24. The frequency allocator 24 selects a frequency band to be allocated to the mobile station device 14 from the frequency band storage unit 22 based on the S/N ratio of the mobile station device 14, the S/N ratio being received from the communication quality acquisition unit 37 (S104).

Thereafter, the base station device 12 notifies the mobile station device 14 of channel information (for example, information including subchannel numbers) indicating the selected frequency band (S110). The mobile station device 14 notified of the channel information by the base station device 12 performs subsequent communication with the base station device 12 in the frequency band indicated by the channel information.

Meanwhile, FIG. 12 illustrates processing of allocating a frequency to the mobile station device 14 based on a frequency offset. Hereinafter, the same steps as those described with reference to FIG. 11 are denoted by the same reference numerals, and repetitive description will be omitted. The frequency band storage unit 22 previously stores multiple frequency bands that can be respectively allocated to the mobile station devices 14 in association with predetermined conditions related to the frequency offset.

The communication quality acquisition unit 37 acquires a frequency offset of the mobile station device 14 based on a received power value and the like of the OFDM signal received from the receiver 33 (S106), and outputs the frequency offset to the frequency allocator 24. The frequency allocator 24 selects a frequency band to be allocated to the mobile station device 14 from the frequency band storage unit 22 based on the frequency offset of the mobile station device 14, the frequency offset being received from the communication quality acquisition unit 37 (S108).

The mobile communication system described above enables appropriate frequency allocation while improving both frequency utilization efficiency and throughput in OFDMA radio communication.

Note that the present invention is not limited to the above embodiment. For example, the present invention is applicable not only to a mobile communication system but also to various OFDMA radio communication systems including a base station device and multiple terminal devices.

Moreover, the entire contents of Japanese Patent Application No. 2006-124195 (tiled on Apr. 27, 2006) are incorporated herein by references.

INDUSTRIAL APPLICABILITY

As described above, the mobile communication system, the base station device and the frequency allocation method for the mobile communication system according to the present invention can realize appropriate frequency allocation while improving both frequency utilization efficiency and throughput in OFDMA radio communication. Thus, the mobile communication system, the base station device and the frequency allocation method for the mobile communication system are advantageous in radio communication such as mobile communication.

The invention claimed is:

1. A mobile communication system comprising:
a plurality of mobile station devices; and
a base station device for performing communication with each of the mobile station devices by orthogonal frequency division multiplexing in a predetermined frequency band, wherein
the base station device includes:
a frequency band storage unit configured to store a plurality of fixed communication bandwidth frequency bands for a subchannel allocatable to each of the mobile station devices, in association with predetermined conditions related to communication quality;
a communication quality acquisition unit configured to acquire communication quality in communication with each of the mobile station devices; and
a frequency allocator configured to select a frequency band from among the plurality of fixed communication bandwidth frequency bands to be allocated as the subchannel to each of the mobile station devices from the frequency band storage unit on the basis of the communication quality acquired by the communication quality acquisition unit, and to notify the mobile station device of channel information indicating the selected frequency band, and
each of the mobile station devices communicates with the base station device in the frequency band indicated by the channel information notified by the frequency allocator, wherein
guard bands are provided between the fixed communication bandwidth frequency bands stored in the frequency band storage unit, wherein the guard bands vary in width from each other according to the communication quality such that the guard band width is independent of the fixed communication bandwidth, and
the guard bands are stored in the frequency band storage unit.

2. The mobile communication system according to claim 1, wherein the communication quality acquisition unit acquires a difference in magnitude between a desired signal level and an interference signal level according to a received signal in a frequency band allocated to each of the mobile station devices.

3. The mobile communication system according to claim 1, wherein the communication quality acquisition unit acquires a frequency difference between a frequency band allocated to each of the mobile station devices and a frequency band of a signal received from the mobile station device.

4. A base station device for performing communication with a plurality of mobile station devices by orthogonal frequency division multiplexing in predetermined frequency bands, the base station device comprising:
a frequency band storage unit configured to store a plurality of fixed communication bandwidth frequency bands for a subchannel allocatable to each of the mobile station devices, in association with predetermined conditions related to communication quality;
a communication quality acquisition unit configured to acquire communication quality in communication with each of the mobile station devices; and
a frequency allocator configured to select a frequency band from among the plurality of fixed communication bandwidth frequency bands to be allocated as the subchannel to each of the mobile station devices from the frequency band storage unit on the basis of the communication quality acquired by the communication quality acquisition unit, and to notify the mobile station device of channel information indicating the selected frequency band, wherein
guard bands are provided between the fixed communication bandwidth frequency bands stored in the frequency band storage unit, wherein the guard bands vary in width from each other according to the communication quality such that the guard band width is independent of the fixed communication bandwidth, and
the guard bands are stored in the frequency band storage unit.

5. A frequency allocation method for a mobile communication system including a plurality of mobile station devices and a base station device for performing communication with each of the mobile station devices by orthogonal frequency division multiplexing in a predetermined frequency band, the frequency allocation method comprising:
a step of storing, in the base station device, a plurality of fixed communication bandwidth frequency bands for a subchannel allocatable to each of the mobile station devices in a frequency band storage unit, in association with predetermined conditions related to communication quality;
a communication quality acquisition step of acquiring, in the base station device, communication quality in communication with each of the mobile station devices;
a frequency allocation step of selecting, in the base station device, a frequency band from among the plurality of fixed communication bandwidth frequency bands to be allocated as the subchannel to each of the mobile station devices from the frequency band storage unit on the basis of the communication quality acquired in the communication quality acquisition step, and of notifying the mobile station device of channel information indicating the selected frequency band; and
a step of communicating, in each of the mobile station devices, with the base station device in the frequency band indicated by the channel information notified in the frequency allocation step, wherein guard bands are provided between the fixed communication bandwidth frequency bands stored in the frequency band storage unit, wherein the guard bands vary in width from each other according to the communication quality such that the guard band width is independent of the fixed communication bandwidth, and the guard bands are stored in the frequency band storage unit.

* * * * *